(12) United States Patent
Matsudaira et al.

(10) Patent No.: US 11,285,985 B2
(45) Date of Patent: Mar. 29, 2022

(54) CONTROL DEVICE

(71) Applicant: FANUC CORPORATION, Yamanashi (JP)

(72) Inventors: Tetsuro Matsudaira, Yamanashi-ken (JP); Toshihiro Fujimori, Yamanashi-ken (JP); Yoshikiyo Tanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/099,559

(22) Filed: Nov. 16, 2020

(65) Prior Publication Data
US 2021/0146983 A1 May 20, 2021

(30) Foreign Application Priority Data
Nov. 20, 2019 (JP) .............................. JP2019-209263

(51) Int. Cl.
*B62B 3/16* (2006.01)
*B62B 3/14* (2006.01)

(52) U.S. Cl.
CPC .............. *B62B 3/16* (2013.01); *B62B 3/1492* (2013.01)

(58) Field of Classification Search
CPC ........ B62B 3/16; B62B 3/1492; B62B 3/1404
See application file for complete search history.

(56) References Cited

U.S. PATENT DOCUMENTS

| | | | | |
|---|---|---|---|---|
| 3,522,954 A * | 8/1970 | Locke | ...................... | B62B 3/006 280/33.998 |
| 5,186,330 A * | 2/1993 | McClure | ................... | B62B 3/16 206/508 |
| 6,578,937 B1 * | 6/2003 | Thoman | ............. | A47B 87/0207 206/373 |
| 7,163,122 B2 * | 1/2007 | Elder | ..................... | B65D 19/18 220/669 |
| 10,442,568 B1 * | 10/2019 | Summers | ............... | B65D 55/10 |
| 2004/0036239 A1 * | 2/2004 | King | ....................... | B62B 3/104 280/33.998 |
| 2004/0195793 A1 * | 10/2004 | Sullivan | .................. | B62B 1/002 280/79.11 |
| 2006/0055135 A1 * | 3/2006 | Tracewell | ............ | H05K 5/0234 280/47.35 |
| 2006/0091096 A1 * | 5/2006 | Velez | ........................ | B62B 3/10 211/194 |
| 2007/0069491 A1 * | 3/2007 | Ferraro | .................. | A47B 87/02 280/79.11 |
| 2007/0262567 A1 * | 11/2007 | Benson | ..................... | E06C 1/39 280/656 |
| 2011/0204013 A1 * | 8/2011 | Lahti | ...................... | B23K 9/321 211/85.8 |
| 2012/0292867 A1 * | 11/2012 | Allam | .................... | B65D 43/16 280/30 |

FOREIGN PATENT DOCUMENTS

JP    11-208481 A    8/1999

* cited by examiner

*Primary Examiner* — Brian L Swenson
(74) *Attorney, Agent, or Firm* — Robert P. Michal, Esq.; Carter, DeLuca & Farrell LLP

(57) ABSTRACT

A stackable control device is equipped with a plurality of casters provided on a side of a bottom surface, and a support member provided on an upper surface and configured to support a control device that is stacked on a side of the upper surface. Two from among the plurality of casters sandwich the support member of a control device that is stacked on the side of the bottom surface.

4 Claims, 5 Drawing Sheets

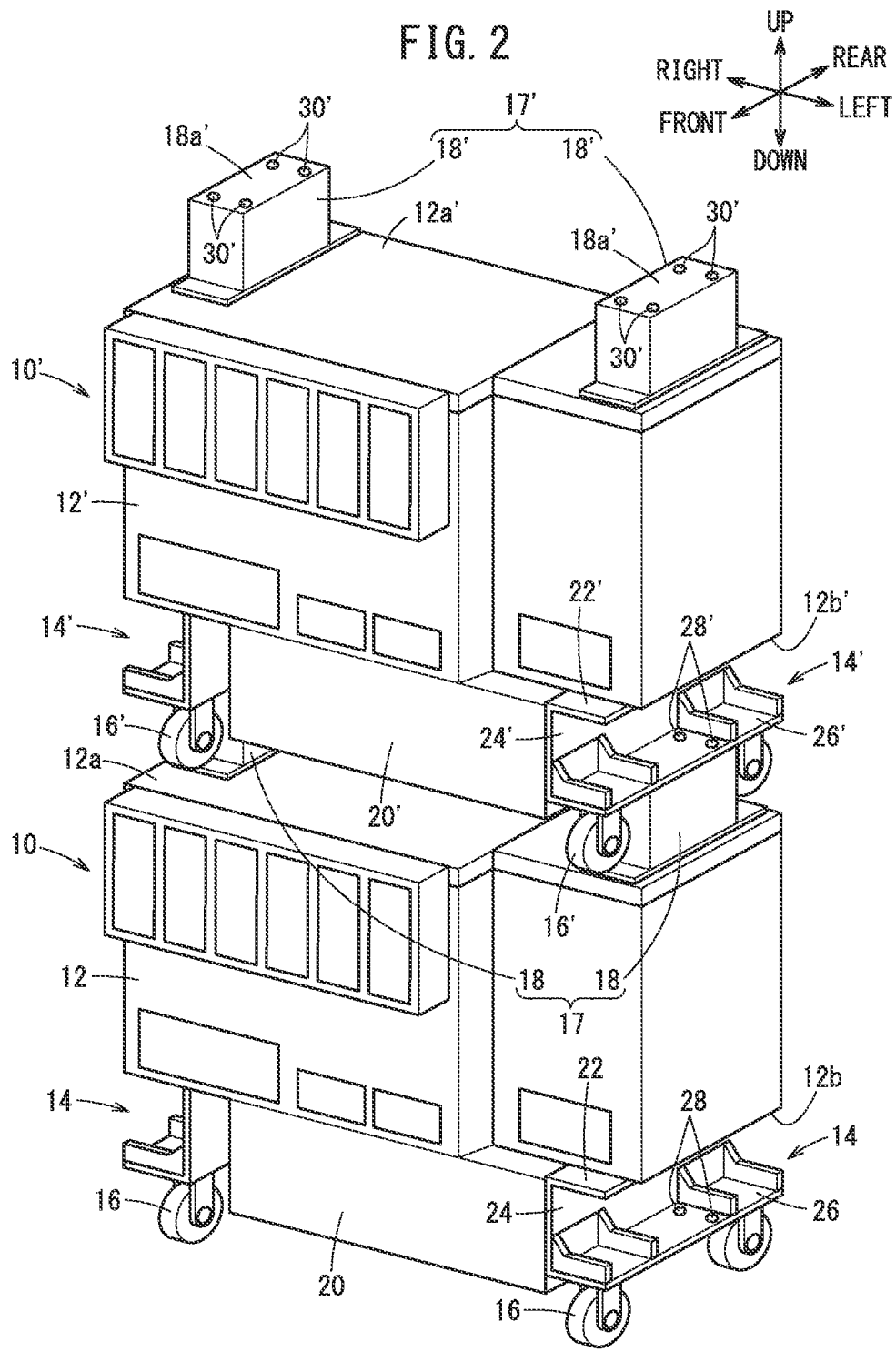

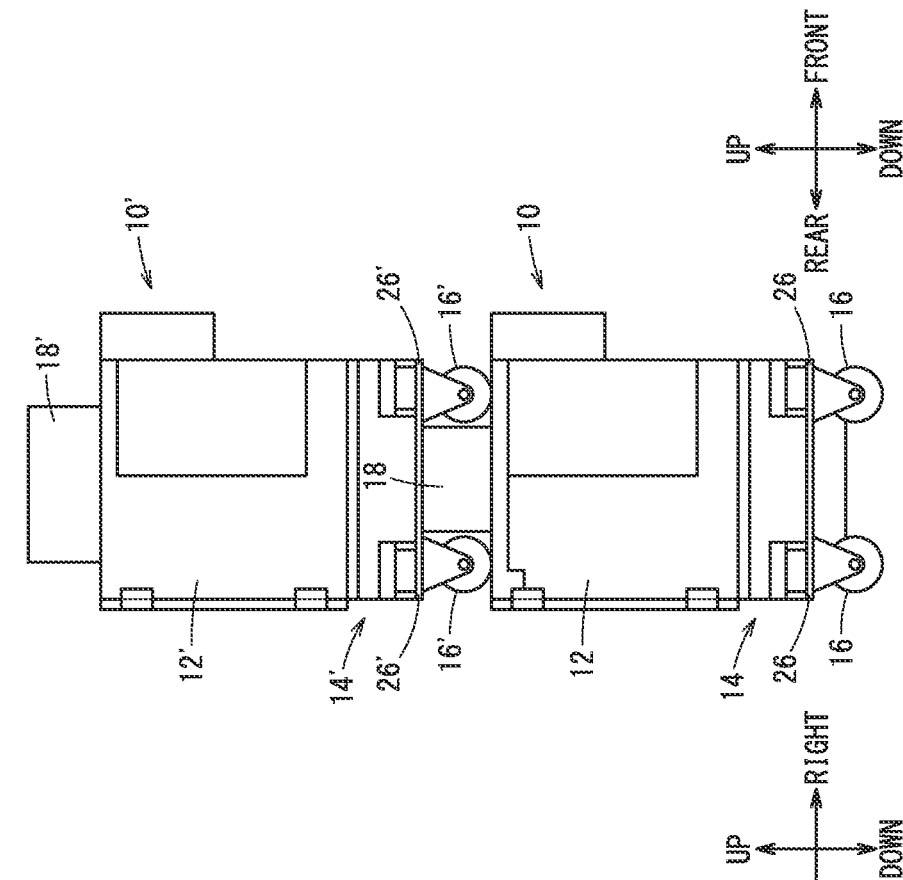
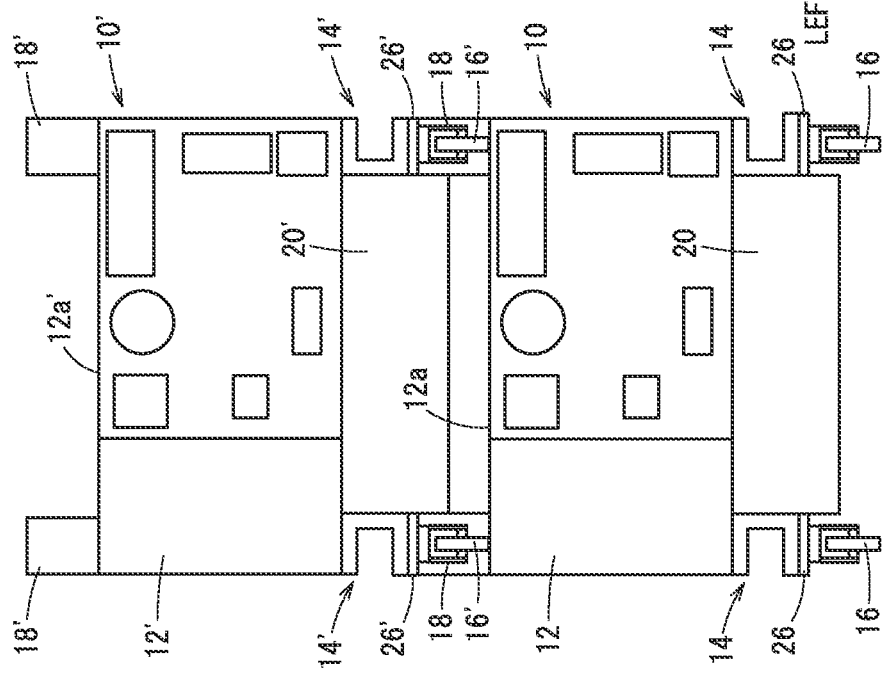

CONTROL DEVICE

CROSS-REFERENCE TO RELATED APPLICATION

This application is based upon and claims the benefit of priority from Japanese Patent Application No. 2019-209263 filed on Nov. 20, 2019, the contents of which are incorporated herein by reference.

BACKGROUND OF THE INVENTION

Field of the Invention

The present invention relates to a control device. In particular, the present invention relates to a stackable control device.

Description of the Related Art

In Japanese Laid-Open Patent Publication No. 11-208481, a dolly is disclosed having a structure in which casters are attached to a flat plate, and wherein the dolly is capable of being easily stacked. According to the disclosure, by providing, on an upper surface of a base plate of the dolly, grooves in which the wheels of the casters of another dolly are accommodated, easy and safe stacking can be achieved when a plurality of the dollies are stacked.

SUMMARY OF THE INVENTION

The plurality of casters can also be installed on a control device of an industrial robot. In this instance, in a factory in which the plurality of industrial robots and control devices therefor are deployed, there is a demand for stacking and arranging the plurality of control devices on which the casters are provided. However, in most cases, the shape of the control devices is not flat, and the control devices have a height (thickness) that is taller than that of the dolly. Accordingly, it is likely that the control devices will become more unstable than the dollies when stacked.

Thus, the present invention has the object of providing a control device which is easily kept stable when stacked.

One aspect of the present invention is characterized by a stackable control device including a plurality of casters provided on a side of a bottom surface, and a support member provided on an upper surface, and configured to support the control device that is stacked on a side of the upper surface, wherein two from among the plurality of casters sandwich the support member of the control device that is stacked on the side of the bottom surface.

According to the present invention, a control device is provided which is easily kept stable when stacked.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a diagram showing a state in which two control devices are stacked;

FIG. 3A is a rear view of FIG. 2;

FIG. 3B is a side view of FIG. 2;

DESCRIPTION OF THE PREFERRED EMBODIMENTS

Hereinafter, a preferred embodiment according to the present invention will be presented and described in detail below with reference to the accompanying drawings.

[Embodiment]

Figure 1:
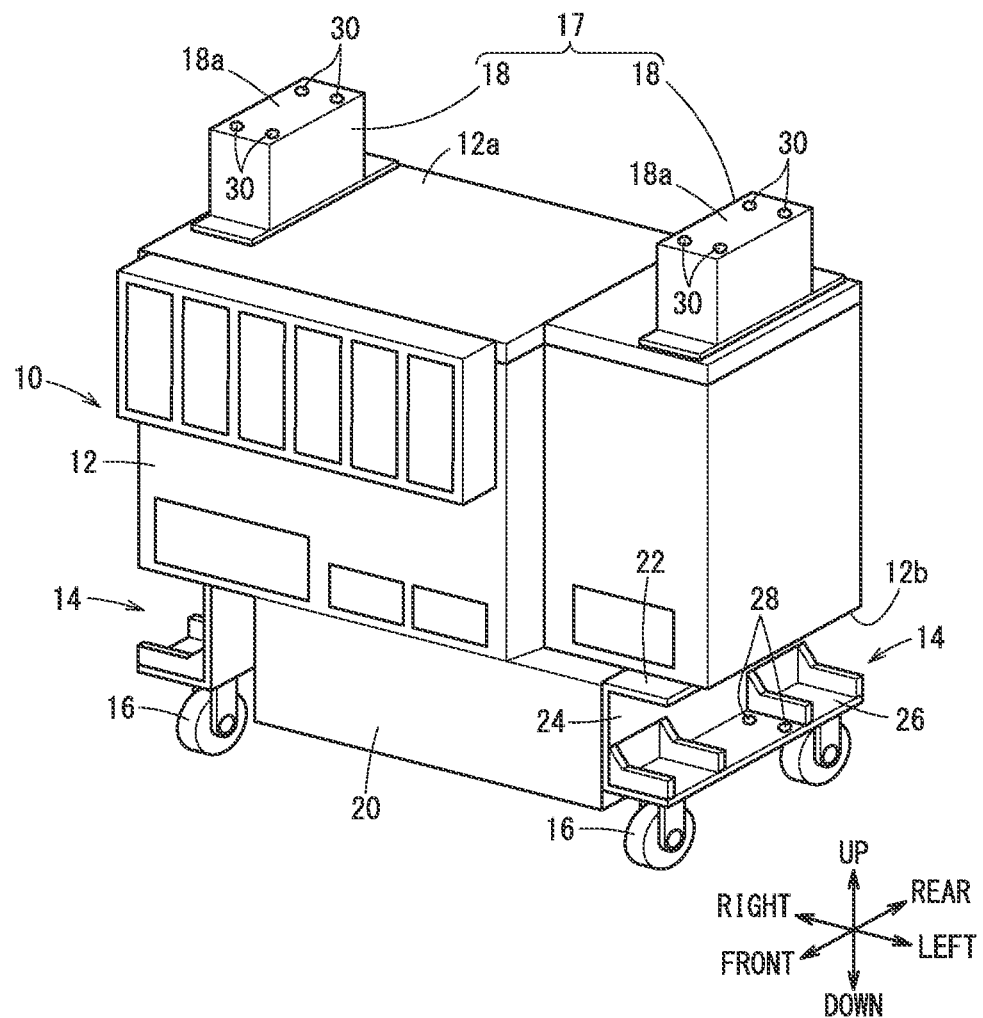
FIG. 1 is an overall configuration diagram of a control device according to an embodiment of the present invention.

FIG. 1 is an overall configuration diagram of a control device 10 according to an embodiment of the present invention. The directions described hereinafter conform with the arrows shown in the drawings. The front and rear directions are directions that are opposite to each other, the left and right directions are directions that are opposite to each other, and the upward and downward directions are directions that are opposite to each other. Moreover, the downward direction is also the direction of gravity.

The control device 10 of the present embodiment serves to control, for example, an industrial robot. The industrial robot is a machine that is deployed in a factory, for example, and which performs operations to produce an industrial product instead of or in collaboration with a person. The control device 10 is equipped with a plurality of electric components in order to control the industrial robot. It should be noted that the control device 10 may serve to control a machine or a device other than an industrial robot.

The control device 10 comprises a main body 12, a plurality of (two) mounting members 14, a plurality of (four) casters 16, support members 17, and a projecting member 20. The main body 12 includes the aforementioned plurality of electric components, and a casing in which the plurality of electric components are accommodated, and the main body 12 is responsible for controlling the industrial robot. The main body 12 is substantially in the shape of a cube, and has an upper surface 12a and a bottom surface 12b. Further, in the front-rear and left-right directions, the main body 12 according to the present embodiment is longer in the left-right direction and shorter in the front-rear direction.

In the present embodiment, the mounting members 14 are mounted on respective both sides of the bottom surface 12b in the left-right direction (first direction). As will be discussed later, the mounting members 14 are members for the purpose of providing the casters 16 on the control device 10 via themselves. Each of the mounting members 14 includes a first member 22, which extends in the front-rear and left-right directions, and is attached to the side of the bottom surface 12b of the main body 12, a second member 24 that extends downwardly from the first member 22, and a plate-shaped third member 26 that extends in the front-rear and left-right directions from the second member 24. More specifically, the mounting members 14 are substantially horizontally Π-shaped in cross-section.

Among the above-described members, the first member 22 and the third member 26 of the mounting member 14 on the left-hand side of the control device 10 extend from the second member 24 toward the leftward direction. Further, the first member 22 and the third member 26 of the mounting member 14 on the right-hand side of the control device 10 extend from the second member 24 toward the rightward direction. Each of the two third members 26 has, formed therein, through holes 28, which will be described later.

The casters 16 are provided on the side of the bottom surface 12b via the third members 26. Two of the four casters 16 of the present embodiment are attached to the lower side of the third member 26 of each of the two mounting members 14. The two casters 16 attached to each one of the mounting members 14 are spaced apart from each other at a predetermined interval in the front-rear direction (second direction). By providing the casters 16, it becomes easy for the operator to move the control device 10 in a planar (two-dimensional) manner.

Further, in the configuration shown in FIG. 1, spaces are formed between the first members 22 and the third members 26. The fork of a forklift can be placed in these spaces. By supporting the bottom surface 12b with such a fork, the control device 10 can be easily lifted.

The term "support members 17" is a general term for the members provided on the upper surface 12a in order to support the upwardly stacked control device 10' (to be described later). The support members 17 include roughly rectangular parallelepiped shaped support portions 18 which extend upwardly. The number of the support portions 18 that the support members 17 can have is not particularly limited, however, according to the present embodiment, the number thereof is two. The arrangement of the two support portions 18 is also not particularly limited, however, according to the present embodiment, one of them is disposed on the left side of the upper surface 12a, and the other of them is disposed on the right side of the upper surface 12a.

The support portions 18 have a height (a length in the up-down direction (vertical direction)) which is greater than or equal to a length from the third members 26 to the installation surface for the casters 16. Further, in the front-rear and left-right directions, the support portions 18 are longer in the front-rear direction and shorter in the left-right direction. The length of the support portions 18 in the longitudinal direction is less than or equal to the distance between the two casters 16 that are mounted on one of the mounting members 14.

The support portions 18 include upwardly facing support surfaces 18a thereon. Holes 30 are formed in the support surfaces 18a. A description will be given later concerning the holes 30. According to the present embodiment, the number of the support portions 18 is two. The two support portions 18 are provided respectively on both sides of the upper surface 12a in the left-right direction.

The projecting member 20 is a member that projects downwardly from the bottom surface 12b. The projecting member 20 projects downward with a length that does not hinder movement of the control device 10 by the casters 16 (the projecting member 20 does not come into contact with the floor). The projecting member 20, for example, is roughly box shaped, and may include, on an inside thereof, electric components in the same manner as the main body 12. It should be noted that the features in which the projecting member 20 is roughly box shaped and contains electric components on the inside thereof are not essential matters of the present embodiment (for example, refer to Modification 1, to be described later).

Hereinafter, a description will be given concerning a state in which two of the control devices 10 are stacked. It should be noted that the number of stacked control devices 10 is not necessarily limited to two. Hereinafter, the structural elements constituting one and the other from among the two stacked control devices 10 may be distinguished from each other by appending the character """ (an apostrophe) thereto.

FIG. 2 is a diagram showing a state in which two of the control devices 10 are stacked. FIG. 3A is a rear view (a viewpoint from the rearward direction) of FIG. 2. FIG. 3B is a side view (a viewpoint from the rightward direction) of FIG. 2.

In FIG. 2, FIG. 3A, and FIG. 3B, a state is shown in which the control device 10' is stacked on the control device 10. In this state, the support portions 18 of the lower control device 10 support the control device 10'. More specifically, the two support portions 18 provided on both sides of the lower control device 10 in the left-right direction support the control device 10' by supporting each of the upper third members 26' with the support surfaces 18a.

At this time, one support portion 18 (on the left-hand side) of the two support portions 18 is sandwiched from the front and the rear between the two casters 16' provided on the left-hand side of the control device 10'. The other (on the right-hand side) of the support portions 18 is sandwiched from the front and the rear between the two casters 16' provided on the right-hand side of the control device 10'.

The two casters 16' preferably sandwich and retain their respective support portions 18 by contacting the support portions 18. However, the term "sandwiched" according to the present embodiment does not necessarily imply that the objects to be sandwiched (the support portions 18) and the sandwiching objects (the casters 16') are in contact with each other.

By sandwiching from the front and the rear one support portion 18 with two casters 16' on each of the both sides in the left-right direction, movement of the control device 10' in the front-rear direction is restricted. More specifically, the control device 10' is prevented from being shifted in position in the front-rear direction on the control device 10. In the case that each of the support portions 18 is sandwiched and retained by the two casters 16', shifting in position of the control device 10' in the front-rear direction can be more suitably prevented.

Further, in a state in which the control device 10' is arranged on the control device 10, the projecting member 20' is positioned between the two support portions 18, and more preferably, is sandwiched between the two support portions 18. Consequently, movement of the control device 10' in the left-right direction is restricted, and therefore, the control device 10' is prevented from being shifted in position in the left-right direction on the control device 10. In the case that the projecting member 20' is sandwiched and retained by the two support portions 18, shifting in position of the control device 10' in the left-right direction can be more suitably prevented.

In the foregoing manner, according to the present embodiment, when the control device 10' is stacked on the control device 10, shifting in position of the control device 10' in the front-rear and left-right directions is prevented. Accordingly, the plurality of control devices 10 (control devices 10') are easily kept stable in the stacked state.

The shape of the upper surface 12a of the control device 10 is not always rectangular, unlike the base plate of a dolly. Accordingly, when the control device 10' is stacked on the control device 10, a region which is capable of supporting the casters 16' of the control device 10' is not always present on the upper surface 12a. In this instance, according to the present embodiment, the support portions 18 of the lower control device 10 can support portions of the upper control device 10' other than the casters 16'. Accordingly, there is no particular problem, even if a region for supporting the casters 16' of the control device 10' from below does not exist on the upper surface 12a of the control device 10.

Figure 4A:
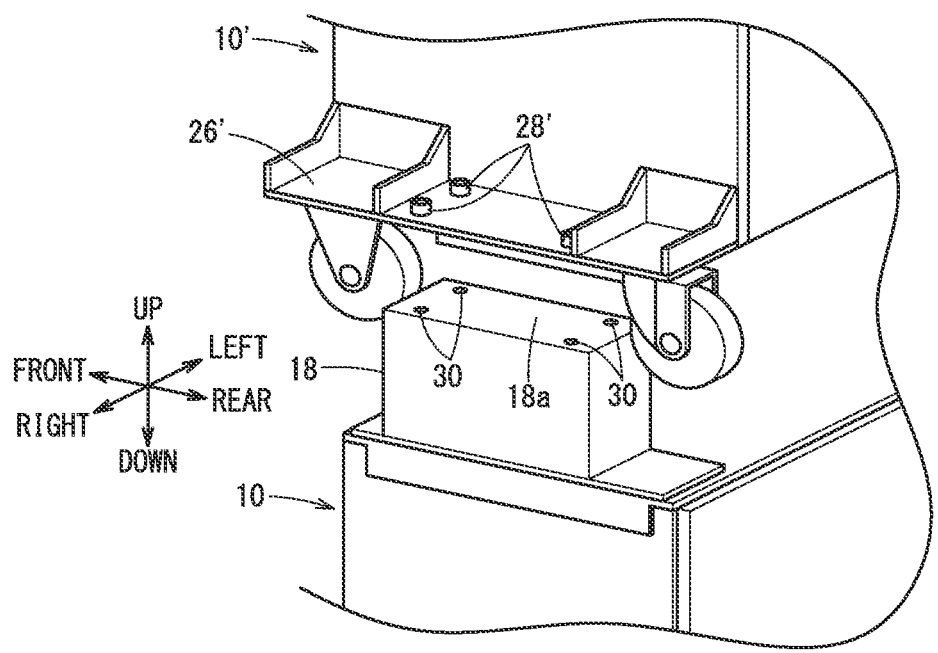
FIG. 4A is a partially enlarged view of a state taking place in the middle of stacking two of the control devices.
Figure 4B:
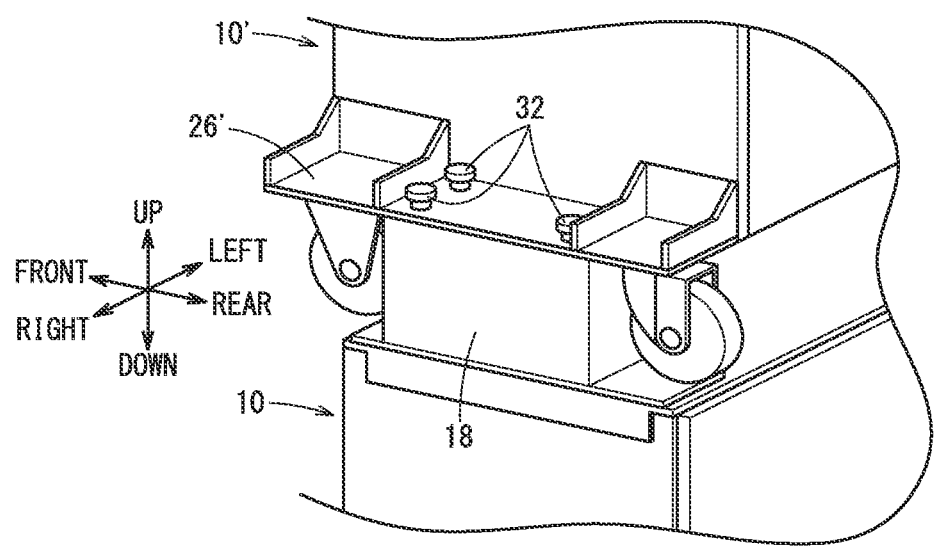
FIG. 4B is a partially enlarged view of a state in which the two control devices are stacked.

FIG. 4A is a partially enlarged view of a state taking place in the middle of stacking two of the control devices 10. FIG. 4B is a partially enlarged view of a state in which the two control devices 10 are stacked.

In this instance, the through holes 28 (through holes 28') of the third members 26 (third members 26') and the holes 30 of the support portions 18 will be described once again. The through holes 28' and the holes 30 are placed in communication with each other when the support surfaces 18a support the third members 26'. Fastening members 32 can be inserted into the through holes 28' and the holes 30 which are placed in communication with each other.

The fastening members 32 serve to fasten the third members 26' and the support members 17 to each other, and for example, are bolts or screws. In this regard, it is preferable that threaded grooves (female screws), into which threaded grooves (male screws) formed on the bolts or the screws are screw-engaged, are formed on the inner surfaces of the through holes 28' and the holes 30.

By fastening the third members 26' and the support members 17 to each other, the control device 10' and the control device 10 are fastened to each other. In this state, by lifting one from among the control device 10 and the control device 10', the other one can also be lifted together therewith. Consequently, it is made easy for the plurality of stacked control devices 10 (control devices 10') to be moved together collectively.

Moreover, in each member, the number of the through holes 28' and the number of the holes 30 are each four according to the present embodiment, however, the number of each of the through holes 28' and the hole 30 is not limited to four.

As described above, according to the present embodiment, the control device 10 is provided which is easily kept stable when stacked.

[Modifications]

Although an embodiment has been described above as an example of the present invention, it goes without saying that various modifications or improvements can be made to the above-described embodiment. It is clear from the scope of the claims that modes to which such modifications or improvements have been added can be included within the technical scope of the present invention.

(Modification 1)

Figure 5:
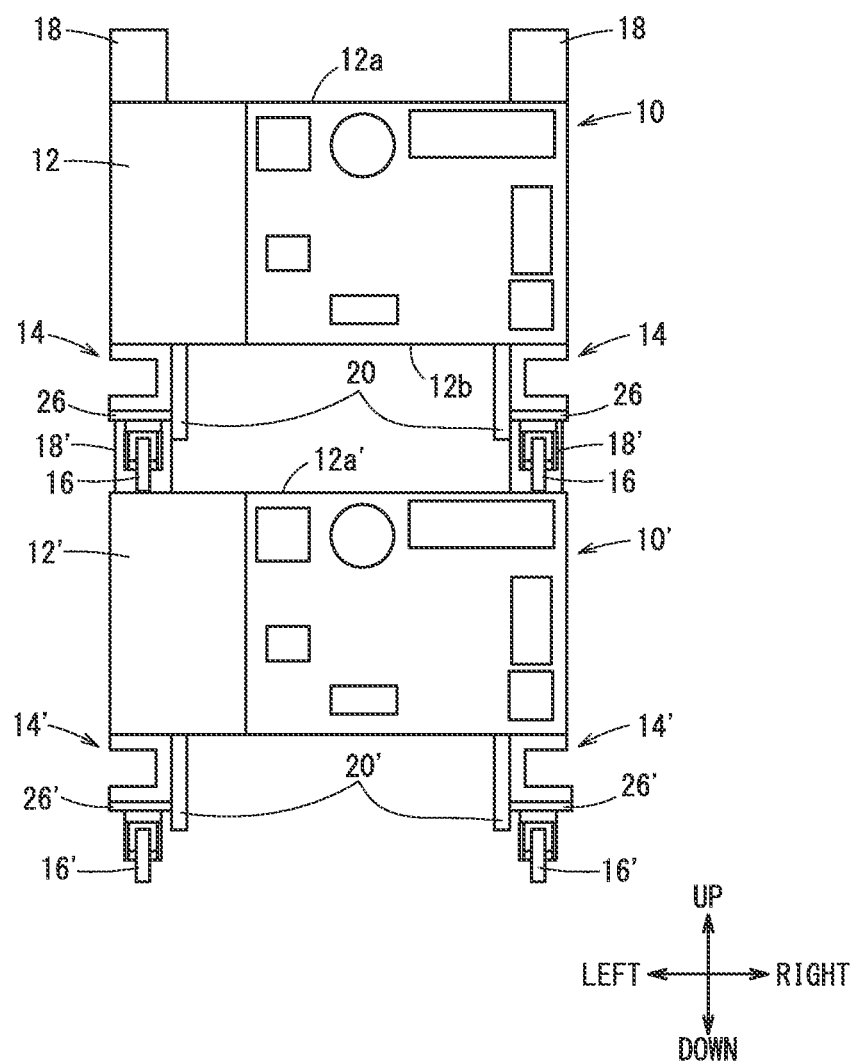
FIG. 5 is a rear view showing a state in which two of the control devices according to a first modification are stacked.

FIG. 5 is a rear view (a viewpoint from the rearward direction) showing a state in which two of the control devices 10 according to a first modification (Modification 1) are stacked. FIG. 5 shows a state in which the control device 10 is stacked on the control device 10'.

As shown in FIG. 5, the projecting member 20 may include two columnar or plate-shaped members which project downward from both sides of the bottom surface 12b in the left-right direction. Consequently, similar to the above-described embodiment, shifting in position of the upwardly stacked control device 10 in the left-right direction is prevented. As shown in FIG. 5, when the control device 10 is stacked on the control device 10', the projecting member 20 is positioned on the right-hand side with respect to the left-side support portion 18', and is positioned on the left-hand side with respect to the right-side support portion 18'. Although it is not essential that the projecting member 20 and the support portions 18' be in contact with each other, from the standpoint of preventing shifting in position of the control device 10, it is more preferable for the projecting member 20 and the support portions 18' to be placed in contact with each other.

(Modification 2)

The support portions 18 may be provided so as to be capable of being detached from the control device 10. For example, the uppermost control device 10 when a plurality of the control devices 10 are stacked does not have an object thereon to be supported by the support portions 18 which are provided by itself. In such a case, in the case it is determined that further stacking is not to be performed thereafter, according to the present modification, the support portions 18 of the uppermost control device 10 can be removed.

[Inventions Obtained from the Embodiment]

Inventions that can be grasped from the above-described embodiment and the modifications thereof will be described below.

The stackable control device (10) is equipped with the plurality of casters (16) provided on the side of the bottom surface (12b), and the support member (17) provided on the upper surface (12a), and which supports the control device (10') that is stacked on the side of the upper surface (12a), wherein two from among the plurality of casters (16) sandwich the support member (17) of the control device (10) that is stacked on the side of the bottom surface (12b).

In accordance with such features, the control device (10) is provided which is easily kept stable when stacked.

The support member (17) may include a plurality of support portions (18) that support the control device (10') that is stacked on the side of the upper surface, the plurality of support portions (18) may include a support portion (18) disposed on one side, and a support portion (18) disposed on another side, from among both sides in a predetermined first direction of the upper surface (12a), and the plurality of casters (16) may include two casters (16) that sandwich, in a second direction perpendicular to the first direction, the support portion (18) disposed on the one side, and two casters (16) that sandwich, in the second direction, the support portion (18) disposed on the other side. In accordance with such features, the stacked control device (10) is prevented from being shifted in position in the second (front-rear) direction.

There may further be provided the projecting member (20) that projects out from the bottom surface (12b), and which serves to restrict movement of the control device (10) along the first direction, by being positioned between the two support portions (18) of the control device (10) that is stacked on the side of the bottom surface (12b). In accordance with such features, the stacked control device (10) is prevented from being shifted in position in the first (left-right) direction.

The support member (17) may include, formed therein, the hole (30) into which the fastening member (32) is inserted to thereby fasten the support member to the control device (10) that is stacked on the side of the upper surface (12a). In accordance with this feature, it is made easy for a plurality of the stacked control devices (10) to be moved together collectively.

What is claimed is:

1. A first control device, comprising:
    an upper surface;
    a bottom surface;
    a plurality of casters provided on a side of the bottom surface; and
    a support member provided on the upper surface, and configured to support a second control device that is arranged on the first control device, the support member including a first support portion and a second support portion that are spaced apart from each other in a first direction, which is perpendicular to a direction of gravity, and that support the second control device, wherein the plurality of casters includes:
- a first pair of casters that are arranged apart from each other in a second direction, which is perpendicular to both the direction of gravity and the first direction, whereby the first support portion is arranged between the first pair of casters with respect to the second direction; and
- a second pair of casters that are apart from the first pair of casters in the first direction and are apart from each other in the second direction, whereby the second support portion is arranged between the second pair of casters with respect to the second direction.

2. The first control device according to claim 1, further comprising a projecting member that projects out downward from a portion of the bottom surface, the portion of the bottom surface being located between the first support portion and the second support portion with respect to the first direction, wherein when the first control device is arranged on a third control device, the projecting member is arranged between a first support portion and a second support portion of the third control device, whereby the projecting member restricts movement in the first direction of the first control device on the third control device.

3. The first control device according to claim 1, wherein each of the first support portion and the second support portion of the first control device is provided with a hole into which a fastening member is inserted to thereby fasten each of the first support portion and the second support portion of the first control device to the second control device.

4. The first control device according to claim 1, further comprising a first mounting member extending downwardly from the side of the bottom surface and defining a recess configured for receipt of a fork of a forklift, the first pair of casters being attached to and extending downwardly from the first mounting member.

* * * * *